US010208830B2

(12) United States Patent
Bruno et al.

(10) Patent No.: US 10,208,830 B2
(45) Date of Patent: Feb. 19, 2019

(54) HYDRAULIC COMPRESSION STOP MEMBER FOR A HYDRAULIC SHOCK-ABSORBER FOR A VEHICLE SUSPENSION WITH PRESSURE RELIEF DEVICE

(71) Applicant: SISTEMI SOSPENSIONI S.p.A., Corbetta (IT)

(72) Inventors: Walter Bruno, Asti (IT); Piero Antonio Conti, Asti (IT); Giordano Greco, Turin (IT)

(73) Assignee: SISTEMI SOSPENSIONI S.p.A., Corbetta (IT)

( * ) Notice: Subject to any disclaimer, the term of this patent is extended or adjusted under 35 U.S.C. 154(b) by 0 days.

(21) Appl. No.: 15/565,074

(22) PCT Filed: Jul. 1, 2016

(86) PCT No.: PCT/EP2016/065553
§ 371 (c)(1),
(2) Date: Oct. 6, 2017

(87) PCT Pub. No.: WO2017/001675
PCT Pub. Date: Jan. 5, 2017

(65) Prior Publication Data
US 2018/0119770 A1  May 3, 2018

(30) Foreign Application Priority Data
Jul. 2, 2015  (IT) .............................. 102015000029963

(51) Int. Cl.
*F16F 9/49* (2006.01)
*F16F 9/516* (2006.01)
(Continued)

(52) U.S. Cl.
CPC .............. *F16F 9/516* (2013.01); *F16F 9/185* (2013.01); *F16F 9/3465* (2013.01); *F16F 9/49* (2013.01);
(Continued)

(58) Field of Classification Search
CPC .... F16F 9/34; F16F 9/185; F16F 9/369; F16F 9/465; F16F 9/516
(Continued)

(56) References Cited

U.S. PATENT DOCUMENTS

| 3,175,645 A | 3/1965 | Schafer et al. |
| 3,272,495 A * | 9/1966 | Axthammer ........... B60G 15/12 |
| | | 188/315 |

(Continued)

FOREIGN PATENT DOCUMENTS

| CN | 103953676 A | 7/2014 |
| DE | 4407264 A1 | 4/1995 |

(Continued)

OTHER PUBLICATIONS

International Search Report and Written Opinion of the International Searching Authority for PCT International Application No. PCT/EP2016/065553 dated Aug. 12, 2016.

*Primary Examiner* — Christopher P Schwartz
(74) *Attorney, Agent, or Firm* — Howard & Howard Attorneys PLLC

(57) ABSTRACT

The hydraulic stop member comprises: a cup-shaped body mounted in a compression chamber of the shock-absorber. A piston is mounted at an end of a rod of the shock-absorber so as to slide in the cup-shaped body when the shock-absorber is close to an end-of-travel position of the compression stroke. The cup-shaped body includes a side wall and a bottom wall which define, along with the piston, a working chamber where a damping fluid of the shock- (Continued)

absorber is compressed by the piston. A bypass conduit connects a working chamber with the portion of the compression chamber placed above a seal ring. A pressure relief valve keeps the bypass conduit closed as long as the pressure in the working chamber remains below a given threshold value and to open the bypass conduit, thereby allowing the discharge of the damping fluid from the working chamber to the compression chamber through the bypass conduit, when the pressure in the working chamber exceeds the threshold value.

8 Claims, 4 Drawing Sheets

(51) Int. Cl.
  *F16F 9/346* (2006.01)
  *F16F 9/18* (2006.01)
  *B60G 13/08* (2006.01)
  *B60G 17/08* (2006.01)

(52) U.S. Cl.
  CPC .............. *B60G 13/08* (2013.01); *B60G 17/08* (2013.01); *B60G 2202/24* (2013.01); *B60G 2206/41* (2013.01); *B60G 2500/10* (2013.01); *B60G 2800/162* (2013.01); *F16F 2228/066* (2013.01); *F16F 2230/42* (2013.01)

(58) Field of Classification Search
  USPC .... 188/275, 282.7, 282.8, 288, 315, 322.13, 188/322.15, 322.22
  See application file for complete search history.

(56) References Cited

U.S. PATENT DOCUMENTS

| | | | | |
|---|---|---|---|---|
| 4,826,094 | A * | 5/1989 | Whiteley | B65H 54/52 188/282.8 |
| 7,870,818 | B2 * | 1/2011 | Rolleke | F15B 15/1447 188/322.15 |
| 9,856,940 | B2 * | 1/2018 | De Kock | F16F 9/465 |
| 2008/0023279 | A1 | 1/2008 | Lee et al. | |
| 2012/0234639 | A1 * | 9/2012 | Teraoka | F16F 9/348 188/280 |
| 2013/0020158 | A1 * | 1/2013 | Park | F16F 9/3405 188/280 |
| 2014/0048365 | A1 * | 2/2014 | Kim | F16F 9/34 188/322.13 |
| 2014/0238798 | A1 * | 8/2014 | De Kock | F16F 9/465 188/317 |
| 2014/0360353 | A1 * | 12/2014 | Baalmann | F16F 9/49 92/143 |
| 2015/0330475 | A1 * | 11/2015 | Slusarczyk | B21D 22/20 188/288 |
| 2016/0091046 | A1 * | 3/2016 | Soromenho | F16F 9/49 188/297 |
| 2016/0165951 | A1 | 6/2016 | Gupta | |

FOREIGN PATENT DOCUMENTS

| | | |
|---|---|---|
| EP | 2952775 A2 | 12/2015 |
| WO | 2014165951 A1 | 10/2014 |
| WO | 2016146660 A1 | 9/2016 |

* cited by examiner

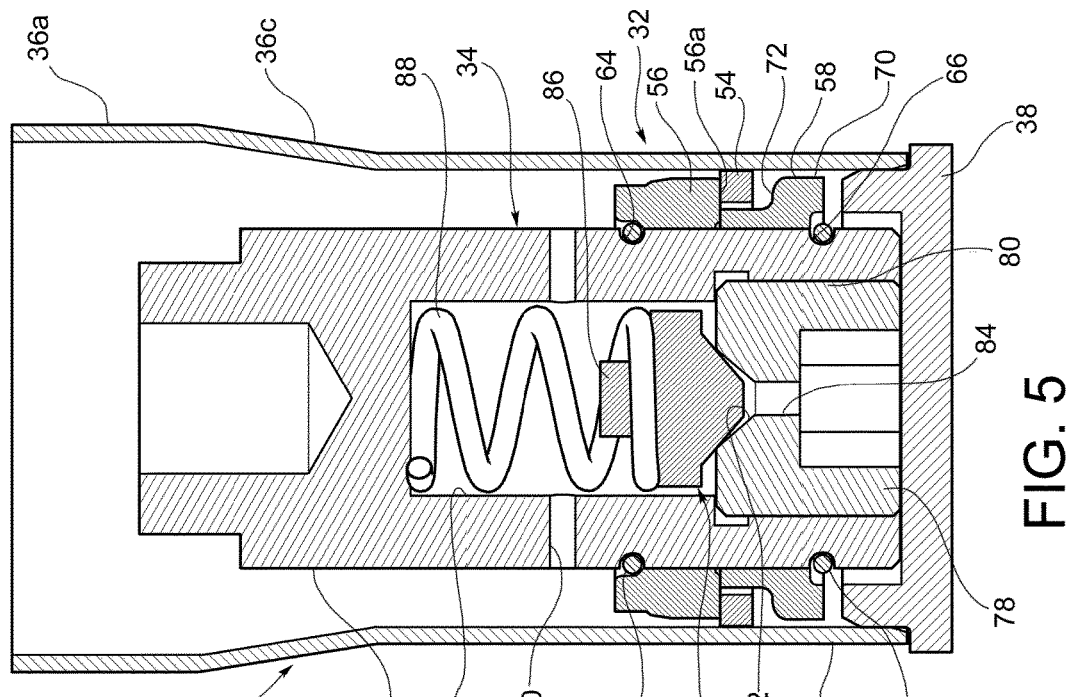
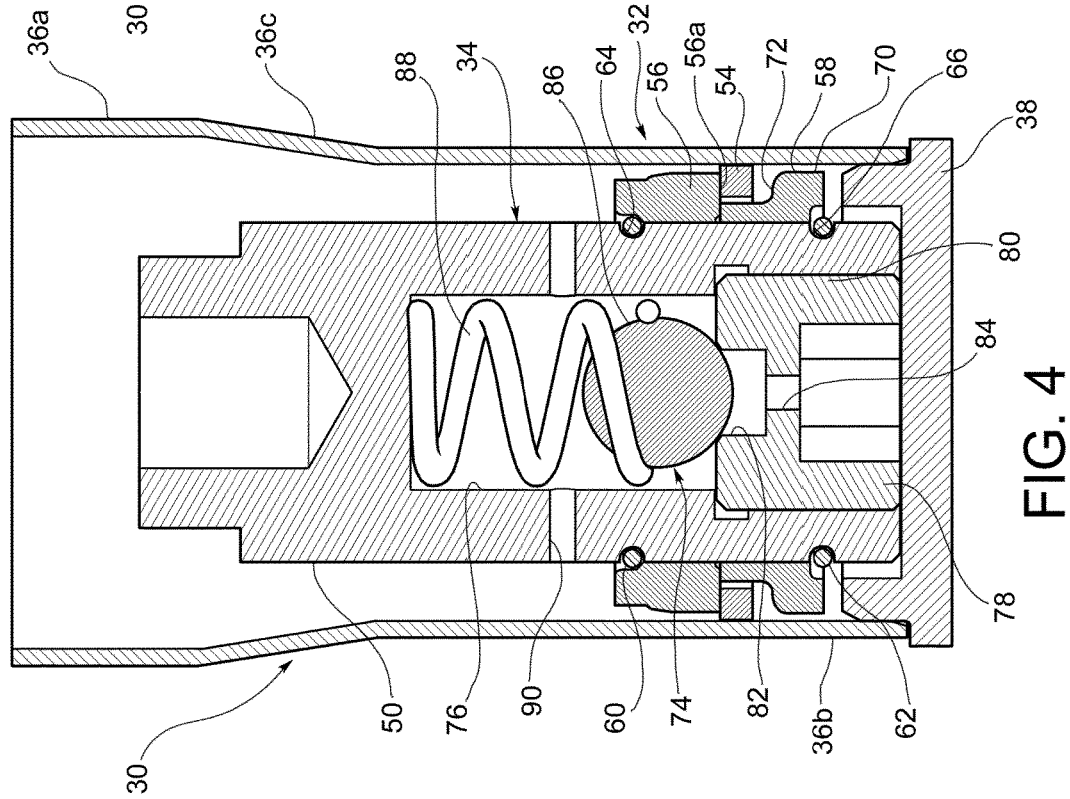

HYDRAULIC COMPRESSION STOP MEMBER FOR A HYDRAULIC SHOCK-ABSORBER FOR A VEHICLE SUSPENSION WITH PRESSURE RELIEF DEVICE

CROSS-REFERENCE TO RELATED APPLICATIONS

The present application is a National Stage of International Patent Application No. PCT/EP2016/065553, filed on Jul. 1, 2016, which claims priority to and all the benefits of Italian Patent Application No. 102015000029963, filed on Jul. 2, 2015, both of which are hereby expressly incorporated herein by reference in their entirety.

BACKGROUND OF THE INVENTION

1. Field of the Invention

The present invention relates in general to a hydraulic stop member intended to be used on a hydraulic shock-absorber, particularly on a twin-tube hydraulic shock-absorber for a vehicle suspension. More specifically, the present invention relates to a so-called hydraulic compression stop member, i.e. a stop member that acts during the compression stroke of the shock-absorber.

2. Description of the Related Art

A twin-tube hydraulic shock-absorber for a vehicle suspension typically comprises an outer cylindrical tube, an inner cylindrical tube which is arranged coaxial to the outer cylindrical tube and defines with the latter an annular chamber filled in an upper portion thereof with gas, a rod which extends coaxially to the inner and outer cylindrical tubes and projects partially therefrom, and a piston which is slidably mounted in the inner cylindrical tube and is attached to the bottom end of the rod. The piston separates the inner volume of the inner cylindrical tube into an extension chamber and a compression chamber, which both contain a damping fluid (typically oil). The piston is provided with a first pair of one-way valves, namely a compensation valve which during the compression stroke of the shock-absorber controls the flow of the damping fluid from the compression chamber to the extension chamber and a rebound valve which during the extension stroke of the shock-absorber controls the flow of the damping fluid from the extension chamber to the compression chamber. A base valve assembly is mounted on the bottom of the shock-absorber and comprises a second pair of one-way valves, namely a compression valve which during the compression stroke controls the flow of the damping fluid from the compression chamber to the annular chamber and an intake valve which during the extension stroke controls the flow of the damping fluid from the annular chamber to the compression chamber. Typically, a hydraulic shock-absorber for a vehicle suspension is also provided with a first stop member, which works during the extension stroke of the shock-absorber, and a second stop member, which works during the compression stroke of the shock-absorber.

Italian patent application No. 102015000008777 in the Applicant's name discloses a hydraulic compression stop member for a hydraulic shock-absorber, particularly for a twin-tube hydraulic shock-absorber for a vehicle suspension, comprising a cup-shaped body, which is mounted in the compression chamber of the shock-absorber, coaxially thereto, and a piston, which is attached to an end of the rod of the shock-absorber, coaxially thereto, so as to slide within the cup-shaped body when the shock-absorber is close to the end-of-travel position of the compression stroke. The cup-shaped body comprises a side wall separate from the inner cylindrical tube of the shock-absorber and a bottom wall, the side wall and the bottom wall defining, along with the piston, a working chamber where a damping fluid of the shock-absorber is compressed by the piston as the latter slides in the working chamber towards the bottom wall of the cup-shaped body. Axial channels are provided on the inner surface of the side wall of the cup-shaped body for allowing the damping fluid to flow axially out of the working chamber as the piston slides in the working chamber towards the bottom wall of the cup-shaped body. The axial channels extend parallel to a longitudinal axis of the cup-shaped body and have a cross-section whose area decreases continuously along this axis towards the bottom wall of the cup-shaped body. The piston of the hydraulic stop member comprises a cylindrical body, which is attached to the rod of the shock-absorber and has an outer diameter smaller than the inner diameter of the side wall of the cup-shaped body, a seal ring, which is axially slidably mounted around the cylindrical body and is arranged to seal against the inner surface of the side wall of the cup-shaped body, and first and second ring-shaped abutment elements, which are axially restrained onto the cylindrical body and axially limit, in either direction, the axial sliding movement of the seal ring on the cylindrical body. The seal ring, the first abutment element and the second abutment element cooperate together such that when the seal ring slides along the inner surface of the side wall of the cup-shaped body during the compression stroke of the shock-absorber the seal ring abuts against the first abutment element and there is no flow of oil from one side of the seal ring to the other one, whereas during the extension stroke of the shock-absorber the seal ring abuts against the second abutment element and the oil is allowed to flow from one side of the seal ring to the other, namely towards the working chamber of the cup-shaped body.

By virtue of the special configuration of the axial channels made on the inner surface of the side wall of the cup-shaped body, the area of the flow cross-section through which the oil contained in the working chamber can flow out of the cup-shaped body decreases continuously towards the bottom wall of the cup-shaped body, and therefore the damping force generated by the stop member on the rod of the shock-absorber increases continuously and progressively as the latter moves towards the end-of-travel position of the compression stroke.

According to this known solution, a plurality of passages are also provided in the bottom wall of the cup-shaped body for allowing the oil to flow out of the working chamber of the cup-shaped body to limit the maximum pressure in that chamber. This allows to prevent the pressure in the working chamber of the cup-shaped body from reaching excessive values that might jeopardize the structural integrity of the stop member. Alternatively, or in addition, to the passages in the bottom wall of the cup-shaped body, a suitably sized ring gap in the seal ring may perform the function of limiting the maximum pressure in the working chamber of the cup-shaped body.

The passages in the bottom wall of the cup-shaped body and/or the ring gap in the seal ring are very simple solutions, from a structural point of view, to the problem of avoiding an excessive increase in the pressure in the working chamber of the hydraulic stop member. However, these solutions do not allow to effectively limit the pressure in the working chamber of the hydraulic stop member. Both the passages in the bottom wall of the cup-shaped body and the ring gap in the seal ring define an oil path which is always open and extends in parallel to the axial channels on the inner surface of the side wall of the cup-shaped body. The pressure drop along this path increases according to a parabolic law as the oil flow rate increases, that is to say, as the speed of the rod of the shock-absorber increases. Therefore, if the speed of the rod is very high the pressure in the working chamber of the hydraulic stop member may reach too high values.

SUMMARY OF THE INVENTION

It is therefore an object of the present invention to provide a hydraulic compression stop member for a hydraulic shock-absorber, particularly for a twin-tube hydraulic shock-absorber for a vehicle suspension, which allows to effectively limit to a predetermined value the maximum pressure of the oil in the working chamber of the hydraulic stop member.

In short, the invention is based on the concept of providing a hydraulic stop member, which has a bypass conduit that connects the working chamber of the stop member with a portion of the compression chamber of the shock-absorber placed above the seal ring of the stop member and which further comprises a pressure relief valve that acts to keep the bypass conduit closed as long as the pressure in the working chamber remains below a given threshold value and to open the bypass conduit, thereby allowing discharge of oil from the working chamber of the stop member to the compression chamber of the shock-absorber through this conduit, when the pressure in the working chamber exceeds the aforesaid threshold value.

By virtue of such a configuration of the stop member, as long as the pressure in the working chamber of the stop member is lower than the predetermined threshold value, the bypass conduit remains closed and therefore the only path through which the oil can flow to leave the cup-shaped body is that through the axial channels on the inner surface of the side wall of the cup-shaped body. Once the pressure in the working chamber has overcome the threshold value, the pressure relief valve starts to open. At this time, if the pressure of the oil in the working chamber of the stop member tends to further increase, the amount of opening of the pressure relief valve increases as well and it is therefore easier for the oil to flow out of the cup-shaped body through the pressure relief valve, which also helps to reduce the pressure in the working chamber. Therefore, by using a pressure relief valve having a flow rate-pressure characteristic curve which is sufficiently flat, that is to say, in which the pressure slightly increases as the flow rate increases, it is possible to keep the pressure of the oil in the working chamber at a relatively constant value, equal to the predetermined threshold value.

BRIEF DESCRIPTION OF THE DRAWINGS

Further features and advantages of the present invention will become more apparent from the following detailed description, given purely by way of non-limiting example with reference to the appended drawings, where:

FIG. 4 is an axial section view of the hydraulic stop member of the shock-absorber of FIG. 1, in the end-of-travel position of the compression stroke of the shock-absorber; and FIG. 5 is an axial section view similar to that of FIG. 4, wherein the hydraulic stop member comprises a pressure relief valve of a different type from that of the hydraulic stop member of FIGS. 1 to 4.

DETAILED DESCRIPTION OF THE INVENTION

In the following description and claims, the terms "axial" and "axially" refer to the direction of the longitudinal axis of the shock-absorber, which is also the direction of the longitudinal axis of the hydraulic stop member. Moreover, terms such as "upper" and "lower" are to be intended as referring to the arrangement of the shock-absorber shown in FIG. 1, wherein the piston of the shock-absorber is mounted at the bottom end of the rod and therefore the rod and the piston move downwards during the compression stroke of the shock-absorber and upwards during the extension stroke of the shock-absorber.

The invention will be described here with reference in particular to a configuration of the hydraulic compression stop member which is similar to that disclosed in the above-mentioned Italian patent application No. 102015000008777. However, as will be clear from the following description, the invention is also applicable to configurations of the hydraulic compression stop member different from the one described here.

Figure 1:
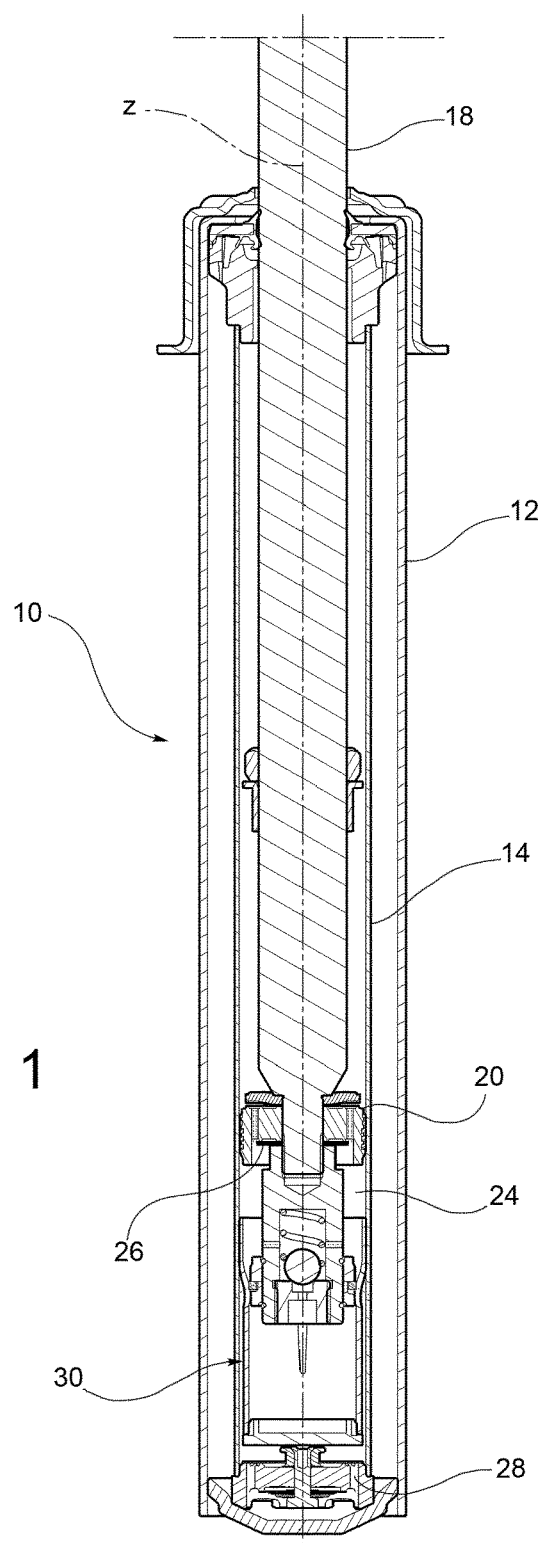
FIG. 1 is an axial section view of a twin-tube hydraulic shock-absorber for a vehicle suspension provided with a hydraulic compression stop member according to an embodiment of the present invention.
Figure 2:
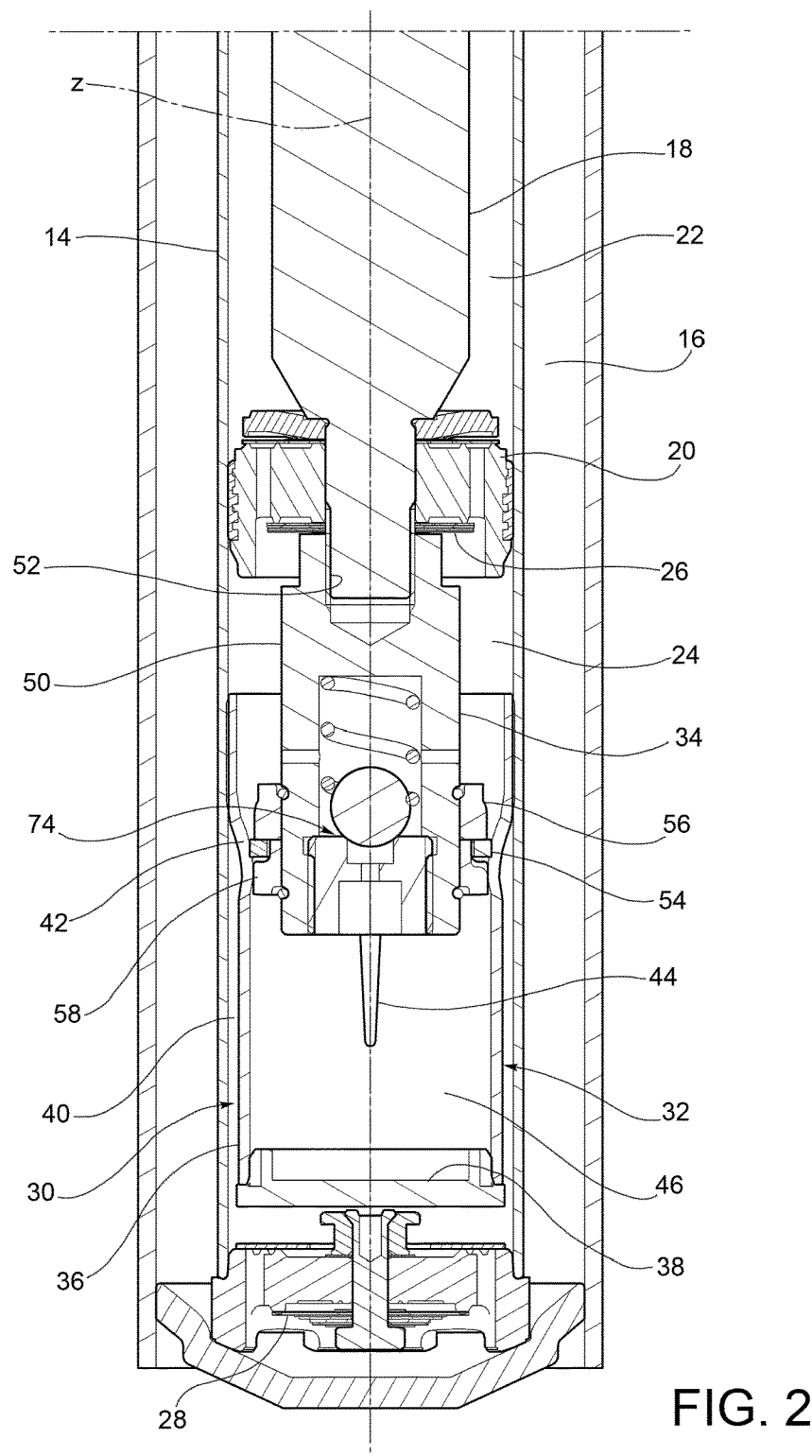
FIG. 2 is an axial section view, on an enlarged scale, of the lower portion of the inner cylindrical tube of the shock-absorber of FIG. 1.

With reference first to FIGS. 1 and 2, a twin-tube hydraulic shock-absorber for a vehicle suspension is generally indicated 10 and comprises, in per-se-known manner, a cylinder having an outer cylindrical tube 12 and an inner cylindrical tube 14 coaxial to the outer cylindrical tube 12, the outer cylindrical tube 12 and the inner cylindrical tube 14 enclosing an annular chamber 16 filled with gas in an upper portion thereof. The shock-absorber 10 further comprises a rod 18 which is arranged coaxially to the two cylindrical tubes 12 and 14 and partially project from them, and a piston 20 which is slidably mounted in the inner cylindrical tube 14 and is attached to the bottom end of the rod 18. The piston 20 separates the inner volume of the inner cylindrical tube 14 into an upper chamber 22, or extension chamber, and a lower chamber 24, or compression chamber, said chambers 22 and 24 containing a damping fluid. Oil is typically used as damping fluid, and therefore the term "oil" will be used hereinafter to identify the damping fluid. It is however clear that the present invention is not limited to the use of oil as damping fluid.

The piston 20 is provided with a first valve assembly 26 comprising a pair of one-way valves, namely a compensation valve which during the compression stroke of the shock-absorber controls the flow of the oil from the compression chamber 24 to the extension chamber 22 and a rebound valve which during the extension stroke of the shock-absorber controls the flow of the oil from the extension chamber 22 to the compression chamber 24. A second valve assembly 28 is provided on the bottom of the shock-absorber 10, more specifically on the bottom of the inner cylindrical tube 14, and comprises a pair of one-way valves, namely a compression valve which during the compression stroke controls the flow of the oil from the compression chamber 24 to the annular chamber 16 and an intake valve which during the extension stroke controls the flow of the oil from the annular chamber 16 to the compression chamber 24. The longitudinal axis of the shock-absorber 10 (that is to say, the longitudinal axis of the cylindrical tubes 12 and 14, as well as of the rod 18) is indicated z.

According to the invention, the shock-absorber 10 is provided with a hydraulic stop member, generally indicated 30, that works during the compression stroke of the shock-absorber to hydraulically dissipate the kinetic energy of the suspension as the shock-absorber moves towards the end-of-travel position of the compression stroke. As is shown in FIGS. 1 and 2, the hydraulic stop member 30 is placed in the compression chamber 24 of the shock-absorber within the inner cylindrical tube 14, in particular on the bottom of this tube.

Figure 3:
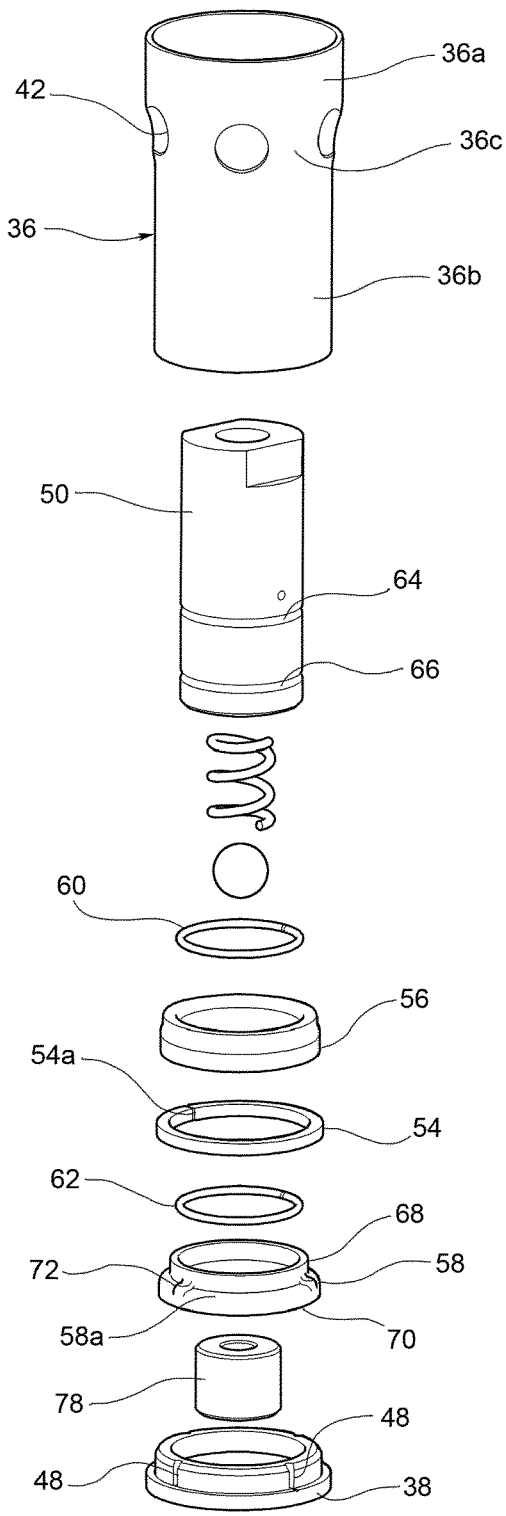
FIG. 3 is an exploded view of the hydraulic stop member of the shock-absorber of FIG. 1.

With reference also to FIG. 3, the hydraulic stop member 30 basically comprises a cup-shaped body 32, which is attached to the inner cylindrical tube 14 of the shock-absorber and extends coaxially thereto, and a piston 34, which is connected to the rod 18, preferably in a releasable manner (for example by use of threaded coupling), and is arranged to slide axially in the cup-shaped body 32 to compress the oil contained therein.

The cup-shaped body 32 is open at its top end, i.e. towards the piston 20 of the shock-absorber, and comprises a side wall 36, separate from the inner cylindrical tube 14 of the shock-absorber, and a bottom wall 38. Preferably, the side wall 36 and the bottom wall 38 are made as separate pieces and are firmly connected to each other, for example by force fitting and/or by a suitable retaining member. According to the illustrated embodiment, the side wall 36 comprises a first wall portion 36a, or upper wall portion, on the side opposite to the bottom wall 38, a second wall portion 36b, or lower wall portion, on the same side as the bottom wall 38, and a third wall portion 36c, or intermediate wall portion, which connects the upper wall portion 36a with the lower wall portion 36b. The upper wall portion 36a has an outer diameter substantially equal to the inner diameter of the inner cylindrical tube 14. The upper wall portion 36a is firmly connected to the inner cylindrical tube 14, for example by force fitting and/or by a suitable retaining member. The lower wall portion 36b has an outer diameter smaller than the inner diameter of the inner cylindrical tube 14, and therefore also smaller than the outer diameter of the upper wall portion 36a. Between the lower wall portion 36b of the cup-shaped body 32 and the inner cylindrical tube 14 of the shock-absorber there is therefore an annular passage 40 (FIG. 2), which is in fluid communication with the portion of the compression chamber 24 beneath the bottom wall 38 of the cup-shaped body 32 of the hydraulic stop member 30. The intermediate wall portion 36c has a plurality of radial openings 42 arranged to put the portion of the compression chamber 24 comprised between the piston 20 of the shock-absorber and the piston 34 of the hydraulic stop member in communication with the annular passage 40, and therefore with the second valve assembly 28 placed on the bottom of the inner cylindrical tube 14 of the shock-absorber.

According to an embodiment, as illustrated in the attached drawings, a plurality of axial channels 44 are provided on the inner surface of the side wall 36 of the cup-shaped body 32, in particular on the inner surface of the lower wall portion 36b, and possibly also on the inner surface of the intermediate wall portion 36c, to allow the oil to axially flow out of the chamber (hereinafter referred to as working chamber 46) enclosed by the lower wall portion 36b and comprised between the piston 34 and the bottom wall 38, as the piston 34 moves towards the bottom wall 38. The axial channels 44 extend parallel to the axis z (coinciding with the longitudinal axis of the cup-shaped body 32), therefore along the direction of movement of the piston 34. The axial channels 44 have a cross-section whose area decreases continuously towards the bottom wall 38. More specifically, the axial channels 44 have a width (that is to say, a size in the circumferential direction) which decreases continuously, for example linearly, towards the bottom wall 38, and preferably also a depth (that is to say, a size in the radial direction) which decreases continuously, for example linearly, towards the bottom wall 38. The flow cross-section through which the oil can flow out of the working chamber 46 decreases therefore continuously as the piston 34 moves in the cup-shaped body 32 towards the bottom wall 38. The decrease in the area of the flow cross-section results in a progressive increase in the damping force generated on the piston 34 of the hydraulic stop member 30, and hence on the rod 18 of the shock-absorber 10 to which the piston 34 is attached. By suitably defining the number and/or the cross-section of the axial channels 44 it is thus possible to obtain a given law of variation of the damping force produced by the hydraulic stop member 30 as a function of the travel of the piston 34 in the cup-shaped body 32.

As shown in FIG. 3, in the bottom wall 38 of the cup-shaped body 32 passages 48 may be provided for allowing the oil to flow out of the cup-shaped body 32 to limit the increase in pressure in the working chamber 46 during the compression stroke.

The piston 34 of the hydraulic stop member 30 comprises a cylindrical body 50 which extends coaxially to the cup-shaped body 32 and is connected to the rod 18 of the shock-absorber, for example by use of a threaded coupling 52, so as to be drivingly connected to the rod 18 in the movement along the axis z. The cylindrical body 50 has an outer diameter smaller than the inner diameter of the lower wall portion 36b of the cup-shaped body 32. The piston 34 further comprises a seal ring 54 having, in per-se-known manner, a ring gap 54a. The seal ring 54 is axially slidably mounted around the cylindrical body 50 and is arranged to seal against the inner surface of the lower wall portion 36b of the cup-shaped body 32 to close the working chamber 46 at the top end thereof (wherein the term "close" does not imply a perfectly fluid-tight closure, as the oil can flow through the ring gap 54a in the seal ring 54).

The piston 34 further comprises a pair of ring-shaped abutment elements 56 and 58, namely an upper abutment element 56 which is placed above the seal ring 54, i.e. on the side of the seal ring facing towards the piston 20 of the shock-absorber, and a lower abutment element 58 which is placed beneath the seal ring 54, i.e. on the side of the seal ring facing towards the working chamber 46 of the hydraulic stop member. The assembly formed by the two abutment elements 56 and 58 is axially restrained onto the cylindrical body 50 by a pair of retaining rings 60 and 62 received in respective circumferential grooves 64 and 66 provided in the cylindrical body 50. The upper abutment element 56 forms an axial abutment surface 56a, facing axially downwards, i.e. towards the lower abutment element 58, against which the seal ring 54 abuts during the compression stroke (FIG. 4). The lower abutment element 58 comprises an upper portion 68, around which the seal ring 54 is mounted, and a lower portion 70 having an outer diameter larger than that of the upper portion 68. The lower portion 70 of the lower abutment element 58 forms a shoulder 58a facing axially upwards, i.e. towards the upper abutment element 56, on which there are provided a plurality of projections 72 against which the seal ring 54 abuts during the extension stroke. The seal ring 54 is therefore axially movable between the axial abutment surface 56a of the upper abutment element 56 and the upper face of the projections 72 of the lower abutment element 58.

According to the invention, the hydraulic stop member 30 has a bypass conduit that connects the working chamber 46 with the portion of the compression chamber 24 of the shock-absorber placed above the seal ring 54. A pressure relief valve 74 is arranged in the bypass conduit and keeps this conduit closed as long as the pressure in the working chamber 46 remains below a predetermined threshold value and to open this conduit, thereby allowing discharge of the oil from the working chamber 46 to the compression chamber 24, when the pressure in the working chamber 46 exceeds this threshold value.

With reference in particular to FIG. 4, in the embodiment proposed here the bypass conduit and the pressure relief valve 74 are provided in the cylindrical body 50 of the piston 34. More specifically, the cylindrical body 50 has a blind axial cavity 76 which is closed at its bottom, i.e. on its side facing towards the bottom wall 38 of the cup-shaped body 32, by a plug 78 attached to the cylindrical body 50, for example by use of threaded coupling 80. The plug 78 has on its upper face, i.e. on its face facing towards the inside of the axial cavity 76, a valve seat 82 which is in fluid communication with the working chamber 46 via an axial through hole 84. A closure member 86 is associated to the valve seat 82 and is normally urged against the valve seat 82 by a spring 88, which is made for example as cylindrical helical spring. In the embodiment shown in FIGS. 1 to 4 the closure member 86 is formed by a ball, whereas in the embodiment shown in FIG. 5 the closure member 86 has a working surface (i.e. a surface cooperating with the valve seat 82) of conical shape. Naturally, the closure member 86 might have a shape different from those illustrated in the attached drawings. The cylindrical body 50 has also a plurality of holes 90, which are made for example as radial holes. The axial cavity 76 is in fluid communication with the portion of the compression chamber 24 of the shock-absorber placed above the seal ring 54 via the holes 90. The bypass conduit is therefore defined by the axial hole 84, the axial cavity 76 and the holes 90.

With reference in particular to FIGS. 4 and 5, the operation of the hydraulic stop member 30 will be described now. During the compression stroke of the shock-absorber (as is shown in FIGS. 4 and 5), the seal ring 54 is in abutment against the axial abutment surface 56a of the upper abutment element 56. When the seal ring 54 of the piston 34 starts to slide along the inner surface of the lower wall portion 36b of the cup-shaped body 32, the oil contained in the working chamber 46 of the hydraulic stop member 30 is forced to flow axially out of this chamber passing through the axial channels 44. As explained above, the area of the flow cross-section formed by the axial channels 44 decreases continuously as the piston 34 moves towards the bottom wall 38 of the cup-shaped body 32. Therefore, the damping action produced by the hydraulic stop member 30 on the piston 34, and hence on the rod 18 of the shock-absorber, increases continuously. Once the seal ring 54 has passed beyond the bottom end of the axial channels 44, the oil can still flow out of the cup-shaped body 32 via the passages 48 (where provided) in the bottom wall 38 of the cup-shaped body 32, which passages have an overall flow cross-section area even smaller than that of the axial channels 44. As the piston 34 moves towards the bottom wall 38 of the cup-shaped body 32, and therefore the volume of the working chamber 46 decreases, the pressure in the working chamber 46 increases. As long as the pressure in the working chamber 46 remains below the threshold value of the pressure relief valve 74 (which threshold value may be set as desired by suitably defining the preload of the spring 88), the pressure relief valve 74 remains closed, i.e. the closure member 86 continues to keep the valve seat 82 closed, thereby preventing oil flow from the working chamber 46 to the portion of the compression chamber 24 above the seal ring 54 through the bypass conduit. On the other hand, when the pressure in the working chamber 46 exceeds the threshold value of the pressure relief valve 74, the closure member 86 starts to lift from the valve seat 82, thereby allowing oil flow from the working chamber 46 to the portion of the compression chamber 24 above the seal ring 54 through the bypass conduit.

When the motion of the shock-absorber is inverted, i.e. during the extension stroke, the seal ring 54 moves away from the axial abutment surface 56a and comes into abutment against the upper face of the projections 72 of the lower abutment element 58. The oil can thus flow towards the working chamber 46 through the gap between the upper face of the seal ring 54 and the axial abutment surface 56a, through the annular passage between the seal ring 54 and the outer surface of the upper portion 68 of the lower abutment element 58 and through the gap between the lower face of the seal ring 54 and the shoulder 58a of the lower abutment element 58.

Naturally, the principle of the invention remaining unchanged, the embodiments and the constructional details may vary widely from those described and illustrated purely by way of non-limiting example, without thereby departing from the scope of the invention as defined in the appended claims.

The invention claimed is:

1. A hydraulic stop member for hydraulic shock-absorbers, in particular for twin-tube hydraulic shock-absorbers for vehicle suspensions, the hydraulic stop member being designed to operate during the compression stroke of the shock-absorber to hydraulically dissipate kinetic energy when the shock-absorber is close to an end-of-travel position of the compression stroke, wherein the hydraulic stop member comprises
a cup-shaped body which is mounted in a compression chamber of the shock-absorber, enclosed by an inner cylindrical tube of the shock-absorber, so as to be arranged coaxially to said inner cylindrical tube,
a piston which is mounted at an end of a rod of the shock-absorber, coaxially thereto, so as to slide in the cup-shaped body when the shock-absorber is close to the end-of-travel position of the compression stroke, wherein the cup-shaped body comprises a side wall separate from said inner cylindrical tube and a bottom wall, the side wall and the bottom wall defining, along with the piston, a working chamber in which a damping fluid of the shock-absorber is compressed by the piston when the latter slides in the working chamber towards the bottom wall of the cup-shaped body, and
a seal ring which is mounted around the piston to close the working chamber at the upper and thereof when the piston slides in the working chamber towards the bottom wall of the cup-shaped body, the hydraulic stop member having a bypass conduit configured to connect the working chamber with a portion of the compression chamber placed above the seal ring, and
that further comprises a pressure relief valve that acts to keep the bypass conduit closed as long as the pressure in the working chamber remains below a given threshold value and to open the bypass conduit, thereby allowing discharge of the damping fluid from the working chamber to the compression chamber through the bypass conduit, when the pressure in the working chamber exceeds said threshold value.

2. The hydraulic stop member as set forth in claim 1, wherein the bypass conduit and the pressure relief valve are located inside the piston.

3. The hydraulic stop member as set forth in claim 2, wherein the bypass conduit comprises
- an axial cavity which is provided in the piston and is closed at its bottom end by a plug,
- at least one first hole which extends through the plug and connects the axial cavity with the working chamber, and
- at least one second hole which extends through the piston and connects the axial cavity with the compression chamber above the seal ring.

4. The hydraulic stop member as set forth in claim 3, wherein the plug has, on a face thereof facing towards the inside of the axial cavity, a valve seat connected with said first hole and wherein the pressure relief valve comprises a closure member that cooperates with the valve seat and an elastic member that urges the closure member against the valve seat to normally keep the bypass conduit closed.

5. The hydraulic stop member as set forth in claim 1, wherein the inner surface of the side wall of the cup-shaped body has axial channels which extend parallel to a longitudinal axis (z) of the cup-shaped body and allow the damping fluid to flow axially out of the working chamber when the piston slides in the working chamber towards the bottom wall of the cup-shaped body, said axial channels having a cross-section whose area decreases continuously along the longitudinal axis (z) towards the bottom wall of the cup-shaped body.

6. The hydraulic stop member as set forth in claim 1, wherein the piston comprises a cylindrical body, attached to the rod of the shock-absorber and around which the seal ring is axially slidably mounted, and first and second ring-shaped abutment elements, which are axially restrained onto the cylindrical body and act to axially limit, in either direction, the axial sliding movement of the seal ring along the cylindrical body, the seal ring, the first abutment element and the second abutment element cooperating together such that when the seal ring slides along the inner surface of the cup-shaped body during the compression stroke of the shock-absorber the seal ring is in abutment against the first abutment element and there is no flow of damping fluid from one side of the seal ring to the other, while during the extension stroke of the shock-absorber the seal ring is in abutment against the second abutment element and the damping fluid is allowed to flow from one side of the seal ring to the other.

7. The hydraulic stop member as set forth in claim 1, wherein a plurality of passages are provided in the bottom wall of the cup-shaped body and/or a gauged ring gap is provided in the seal ring)-of the piston to allow leakage of the damping fluid from the working chamber of the cup-shaped body.

8. A twin-tube hydraulic shock-absorber for vehicle suspensions, comprising a hydraulic stop member as set forth in claim 1, wherein the hydraulic stop member is mounted in a compression chamber of the shock-absorber enclosed by an inner cylindrical tube of the shock-absorber.

* * * * *